No. 880,091. PATENTED FEB. 25, 1908.
P. PATON.
APPARATUS FOR CONVEYING AND DISCHARGING ORES, &c.
APPLICATION FILED SEPT. 21, 1906.
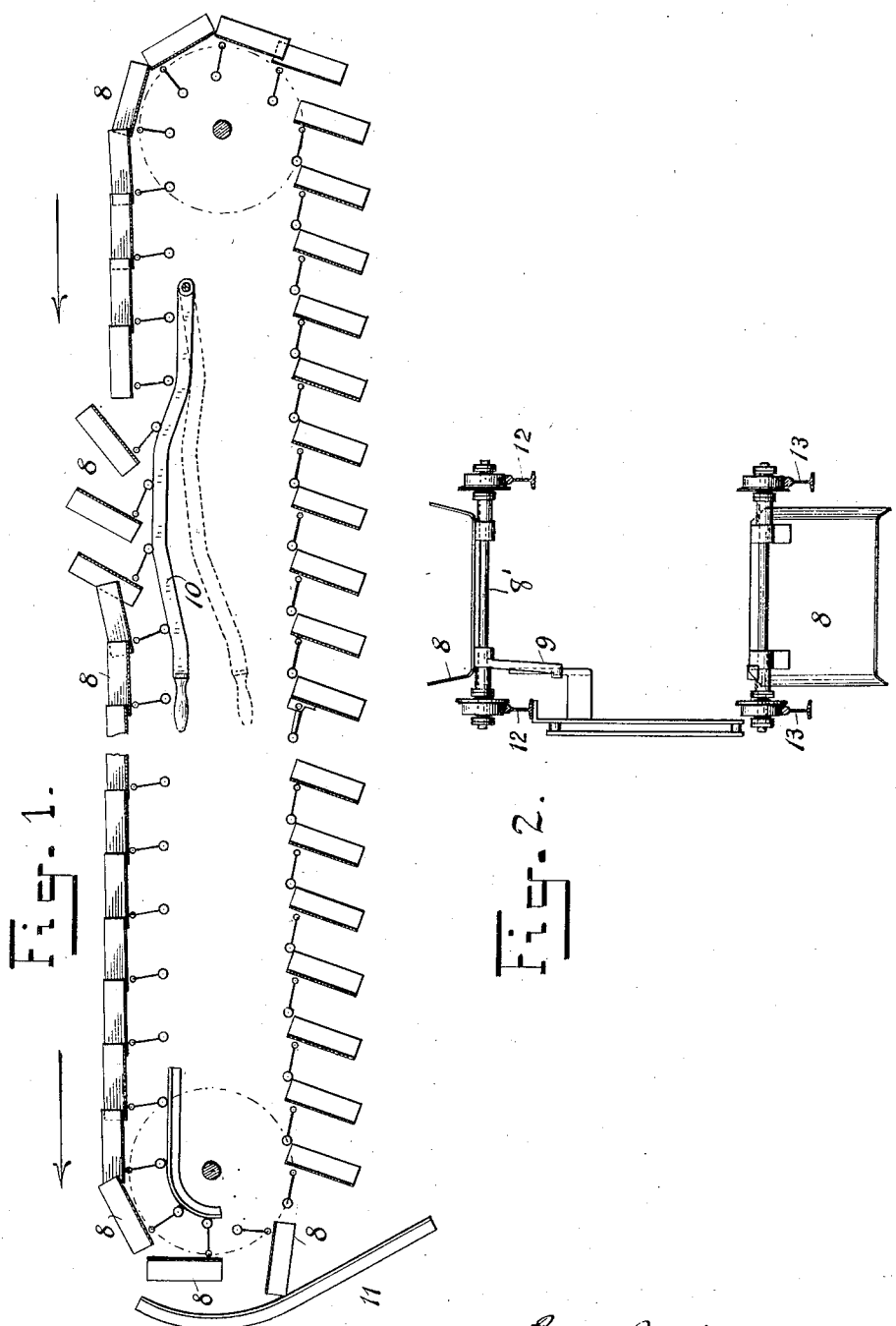

No. 880,091. PATENTED FEB. 25, 1908.
P. PATON.
APPARATUS FOR CONVEYING AND DISCHARGING ORES, &c.
APPLICATION FILED SEPT. 21, 1906.

3 SHEETS—SHEET 2.

No. 880,091. PATENTED FEB. 25, 1908.
P. PATON.
APPARATUS FOR CONVEYING AND DISCHARGING ORES, &c.
APPLICATION FILED SEPT. 21, 1906.

3 SHEETS—SHEET 3.

UNITED STATES PATENT OFFICE.

PETER PATON, OF LONDON, ENGLAND.

APPARATUS FOR CONVEYING AND DISCHARGING ORES, &c.

No. 880,091.    Specification of Letters Patent.    Patented Feb. 25, 1908.

Application filed September 21, 1906. Serial No. 335,610.

*To all whom it may concern:*

Be it known that I, PETER PATON, a subject of Great Britain, residing at London, in the county of London, England, have invented certain new and useful Improvements in Apparatus for Conveying and Discharging Ores, Grains, &c., of which the following is a specification, reference being had therein to the accompanying drawing.

This invention relates to improvements in apparatus for conveying and discharging ores, grains, macadam, or other materials.

Figure 3:
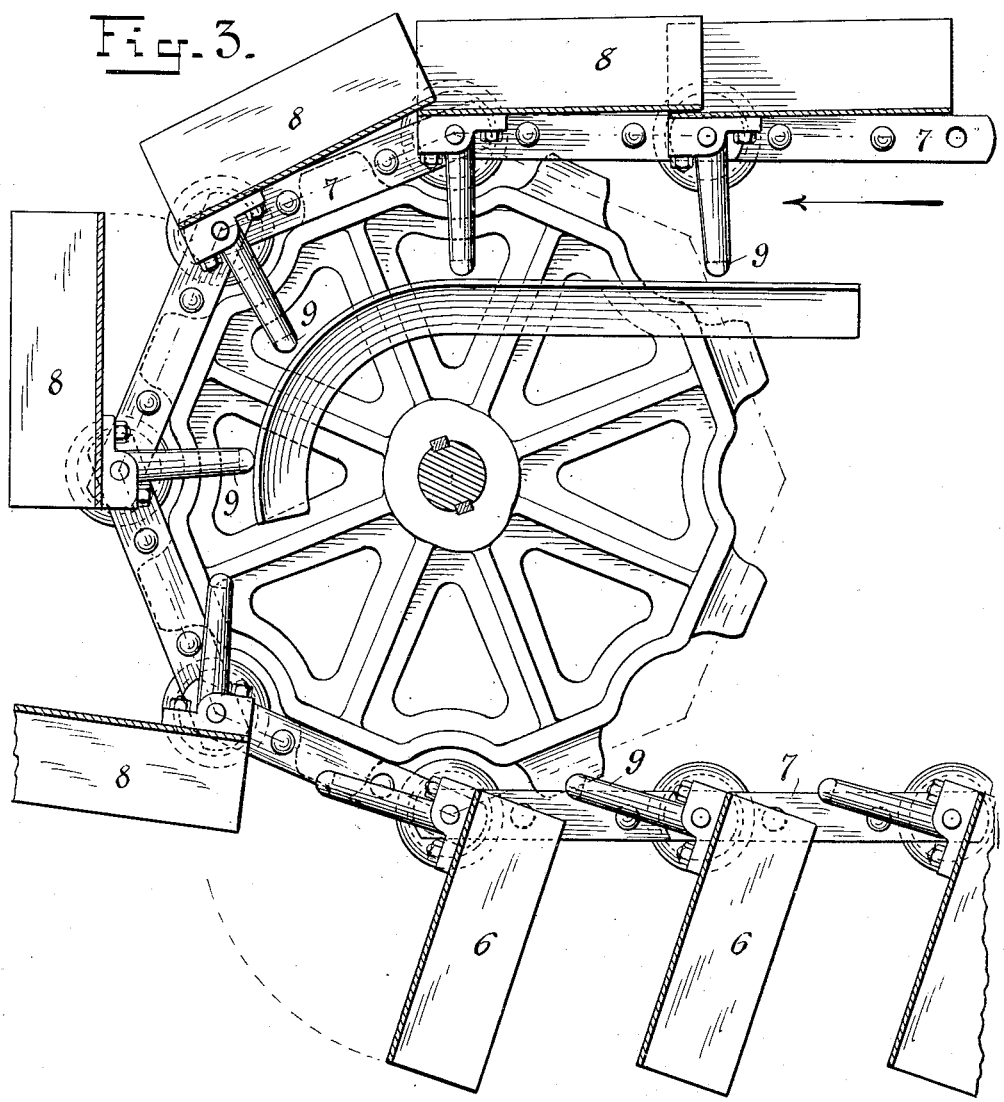
Figure 4:
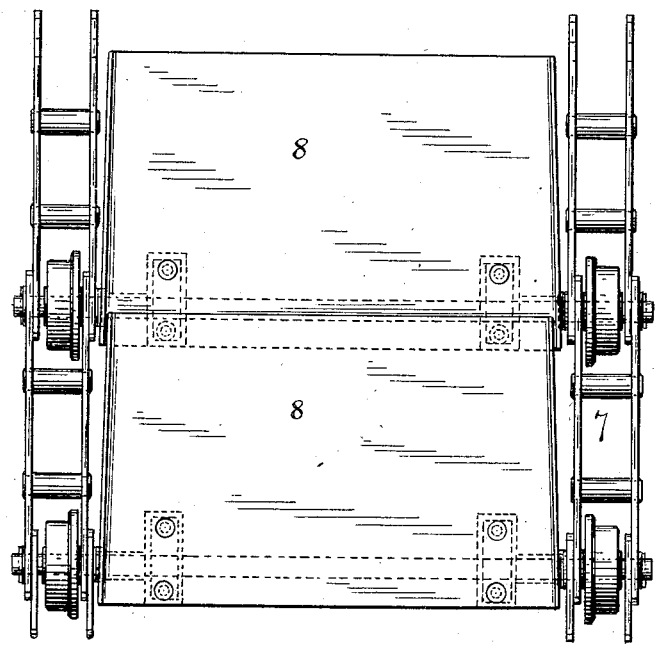
Figure 5:
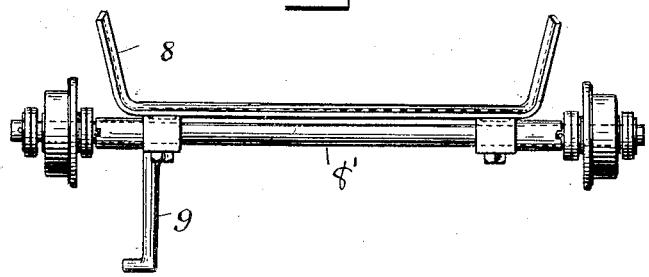

The improved apparatus is illustrated in the accompanying drawings which form a part of this specification, and in which Figure 1 is a diagrammatic view of the conveying device and relative position of its essential parts at various points of its travel, illustrating the method of operation. Fig. 2 an end elevation of the trucks and tracks upon which the conveyer is supported and operated. Fig. 3 a side view enlarged of one end of the conveyer with supporting and operative devices. Fig. 4 a plan view showing two of the trucks and attached chain links and conveying trays; and Fig. 5 an end view, detached, of a truck, conveying tray, and pendent tilting arm.

Similar numerals of reference indicate corresponding parts in the several figures.

The conveyer comprises a series of trays 8 composed of straight or flanged plates which are pivoted to a link chain or chains 7, and arranged successively to form an endless band of trays combined with devices for tilting one or more of said trays at any intermediate place desired. The conveyer is supported upon trucks which are mounted upon tracks and is operated by sprocket wheels located at the opposite ends of the endless chain, which may be made of any desired length.

The trays are made of mild steel, or other suitable material, and are attached to the truck axles 8' extending transversely of the chain links which are pivoted upon the truck axles. The axle bearing at one side is provided with a pendent arm or rod 9 which is designed to engage with a pivoted dumping lever 10 when the latter is raised as shown in Fig. 1, and which may be located at any intermediate point of the travel of the conveyer desired.

As shown in Fig. 1, when the pendent arm 9 contacts with the cam surface of the lever 10 the connected tray is tilted forward and in the direction of its travel said arm and lever retaining the tray in an approximately vertical position for a time sufficient to discharge its contents, and then causing the tray to return to its normal position.

At the extreme end where the trays begin to reverse the direction of their travel, shown in Fig. 1, a guiding device 11 is provided so that when the trays tilt over to allow a free discharge of material at this point when required, each contacts at its free end with the curved guiding plate 11 and for a distance retains the tray in a reversed or dumping position, as shown. Following such contact with the plate 11 the trays return suspended from the chain in an approximately vertical position. In discharging the trays from the upper run the suspended vertical position of the trays on the lower run allows the contents of the tray to pass from the upper run or track 12 through the returning track 13 without obstruction, thereby obviating the necessity for interposing deflecting plates or chutes, &c. At the end of the returning flight, the trays, by the action of gravity, assume their normal position for again being charged with material on the upper run.

The traveling endless link chain conveyer supporting the trays is carried upon trucks which traverse the rails 12 and 13, and is moved by the engagement of the truck axles with the sprocket wheels which are arranged at the opposite ends of the conveyer, as shown in dotted lines Fig. 1, and in detail of construction in the enlarged view, Fig. 3.

The main features of this invention are comprised in means for maintaining the trays in carrying position on the load line and in dumping position at the end or on the return line, combined with means for dumping one or a number of the trays of their contents at any desired place in the load line, whereby the contents are allowed to pass between the trays on the return line without obstruction, and with means for guiding the trays at the end of the band and there retain the same in dumping position. With a conveyer of great length a plurality of dumping means may be employed at desired points.

What I claim and desire to secure by Letters-Patent is:—

1. A chain conveyer comprising a series of pivoted trays forming an endless band, in which each tray is pivoted on the chain and provided with a rigid projecting arm arranged to make contact with a dumper device fitted adjacent to the upper track of the trays, the said trays adapted to hang in vertical position on the lower or return track and allow the material dumped from the upper track to drop freely through as set forth.

2. In a chain conveyer, the combination with a series of trays adapted to travel in loaded position along the upper run or track, of the curved plate 11 located at the end of the conveyer to contact with the free end of each tray where the direction of the travel of the trays is reversed and hold the same in dumping position at such place.

In testimony whereof I affix my signature in presence of two witnesses.

PETER PATON.

Witnesses:
HENRY PELHAM SMITH,
WILLIAM OSWALD BROWN.